United States Patent
Orikasa et al.

(10) Patent No.: US 9,489,155 B2
(45) Date of Patent: Nov. 8, 2016

(54) IMAGE PROCESSING DEVICE

(71) Applicant: RISO KAGAKU CORPORATION, Minato-ku, Tokyo (JP)

(72) Inventors: Daisuke Orikasa, Tsukuba (JP); Yukimoto Sakata, Tsukuba (JP)

(73) Assignee: RISO KAGAKU CORPORATION, Tokyo (JP)

(*) Notice: Subject to any disclaimer, the term of this patent is extended or adjusted under 35 U.S.C. 154(b) by 0 days.

(21) Appl. No.: 14/683,804

(22) Filed: Apr. 10, 2015

(65) Prior Publication Data

US 2015/0317118 A1    Nov. 5, 2015

(30) Foreign Application Priority Data

Apr. 30, 2014  (JP) .................. 2014-093509

(51) Int. Cl.
*G06F 3/12* (2006.01)

(52) U.S. Cl.
CPC ........... *G06F 3/1205* (2013.01); *G06F 3/1258* (2013.01); *G06F 3/1285* (2013.01)

(58) Field of Classification Search
CPC .... G06F 3/1298; G06F 3/1204; G06F 3/121; G06F 3/1254; G06F 3/1237; G06F 3/1205; G06F 3/1258; G06F 3/1285
USPC .............................. 358/1.11, 1.13, 1.15, 1.18
See application file for complete search history.

(56) References Cited

U.S. PATENT DOCUMENTS

| | | | |
|---|---|---|---|
| 5,226,112 A | 7/1993 | Mensing et al. | |
| 5,555,435 A * | 9/1996 | Campbell | G06F 17/271 358/1.13 |
| 5,606,649 A * | 2/1997 | Tai | G06F 17/214 358/1.11 |
| 6,234,689 B1 * | 5/2001 | Rohrbaugh | G06F 9/4443 717/113 |
| 7,589,861 B2 * | 9/2009 | Hirano | G06F 3/1206 358/1.12 |
| 8,830,493 B2 * | 9/2014 | Ito | G06F 3/1209 358/1.13 |
| 2002/0149792 A1 * | 10/2002 | Gauthier | G06F 17/211 358/1.18 |
| 2007/0115488 A1 * | 5/2007 | Engelman | G06F 17/214 358/1.13 |
| 2007/0248373 A1 * | 10/2007 | Vekaria | G03G 15/00 399/82 |
| 2012/0140288 A1 | 6/2012 | Tsuchida | |
| 2015/0317118 A1 * | 11/2015 | Orikasa | G06F 3/1298 358/1.15 |

FOREIGN PATENT DOCUMENTS

JP   2012121167 A   6/2012
WO      0062178 A1  10/2000

OTHER PUBLICATIONS

Extended European Search Report dated Oct. 8, 2015, issued in counterpart European Application No. 15163532.3.

* cited by examiner

*Primary Examiner* — Allen H Nguyen
(74) *Attorney, Agent, or Firm* — Holtz, Holtz & Volek PC (57) ABSTRACT

An image processing device accepts a user-defined code, which is a command that implements a process desired by a user and is written in the same page description language as a print job to be processed, and merges the print job to be processed and the user-defined code.

3 Claims, 5 Drawing Sheets

F I G. 1

| KEYWORD | FLAG |
|---|---|
| R G B setrgbcolor | 1 |
| execform | 0 |
| %%PageX and showpage | 0 |
| showpage | 0 |
| ⋮ | ⋮ |

IMAGE PROCESSING DEVICE

CROSS REFERENCE TO RELATED APPLICATION

This application is based upon and claims the benefit of priority of the prior Japanese Patent Application No. 2014-093509, filed on Apr. 30, 2014, the entire contents of which are incorporated herein by reference.

FIELD

The present invention relates to an image processing device.

BACKGROUND

Conventionally, a print job written in a page description language is generated via a printer driver or the like when an instruction for printing electronic data such as document data, image data or the like is issued by an information processing device such as a PC (Personal Computer) or the like. Then, the generated print job is output to a printing device, which executes a printing process on the basis of the input print job.

When a printing device executes a printing process, the process is normally executed on the basis of an input print job as described above.

In the meantime, a method for executing a printing process on the basis of printing settings different from those of an input print job is proposed (for example, see Patent Document 1).

The method proposed by Patent Document 1 switches, on the basis of user designation, between printing settings made when data to be printed which is held in a portable memory is printed directly and those included in data to be printed.

[Patent Document 1] Japanese Laid-open Patent Publication No. 2012-121167

SUMMARY

An image processing device according to claim 1 is an image processing device supporting a print job written in a page description language, which is a programming language. The image processing device includes: input means for inputting a user-defined code, which is a command that implements a process desired by a user and is written in the same page description language as the print job to be processed; and a processor for executing a process of merging the print job to be processed and the user-defined code.

A non-transitory recording medium according to claim 4 is a recording medium having stored therein a program for causing a computer of an image processing device supporting a print job written in a page description language, which is a programming language, to execute a process comprising: accepting a user-defined code, which is a command that implements a process desired by a user and is written in the same page description language as the print job to be processed; and merging the print job to be processed and the user-defined code.

With the image processing device according to claim 1 and the recording medium according to claim 4, a print job to be processed and an input user-defined code are merged. As a result, a function desired by a user can be added on the side of the user, and can be applied to the print job to be processed even if the function is not supported. The print job to be processed and the user-defined code are enabled to be merged, whereby also processes other than print settings, such as a measurement of the length of processing time for each page and the like can be executed. This makes it easy for a user to add his or her desired function on the side of the user, leading to a reduction in a development period. Moreover, since development resources can be concentrated on principal functions, development efficiency can be increased.

The image processing device according to claim 2 merges the print job to be processed and the user-defined code when a specified keyword is present within a code that configures the print job to be processed in the image processing device according to claim 1.

With the image processing device according to claim 2, the print job to be processed and the input user-defined code are merged when a specified keyword is present within a code that configures the print job to be processed. As a result, it becomes possible to not merge the print job to be processed and the user-defined code when there is no portion to be processed that is executed by adding the user-defined code in the print job to be processed. As a consequence, a logical error caused at the time of the merging can be prevented from being caused.

The image processing device according to claim 3 further includes storage means for storing the input user-defined code in the image processing device according to claim 1 or 2.

With the image processing device according to claim 3, the input user-defined code is held. As a result, for example, a maintenance person of a maker can learn a function desired by a user by checking the user-defined code added by the user, whereby development efficiency can be increased.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT

An embodiment according to the present invention is described in detail below with reference to the drawings.

Figure 1:
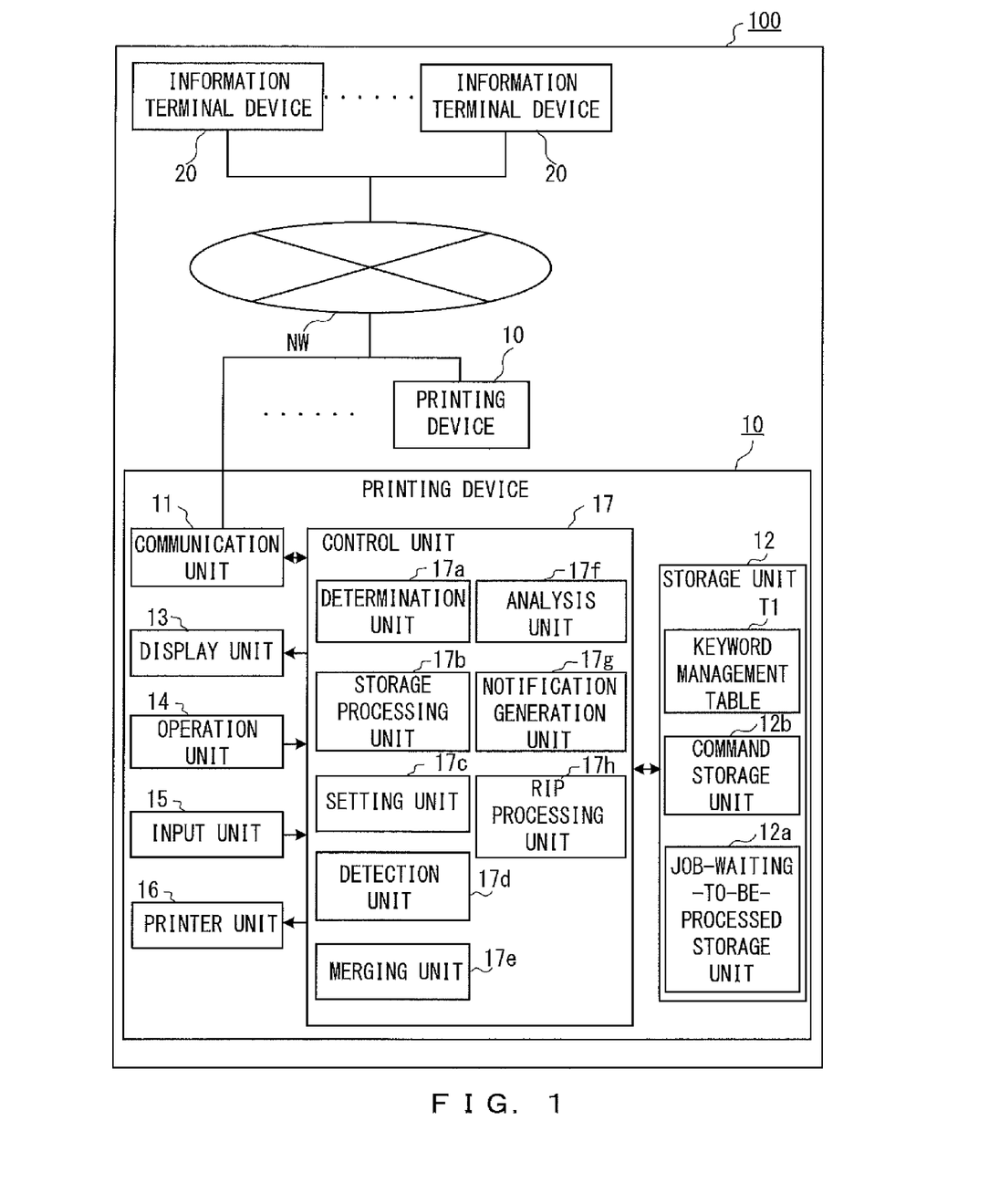
FIG. 1 is a functional block diagram illustrating a configuration example of a printing system according to an embodiment, and that of a printing device configuring the printing system.

FIG. 1 is a functional block diagram illustrating a configuration example of a printing system 100 according to an embodiment, and that of a printing device 10 configuring the printing system 100. Referring to FIG. 1, the printing system 100 includes one or a plurality of printing devices 10, which are image processing devices, and one or a plurality of information terminal devices 20. The printing devices 10 and the information terminal devices 20 are communicatively coupled via a network NW.

A data format of a print job output from the information processing devices 20 is assumed to be a page description language, which is a programming language in itself, and a PS code in this embodiment.

The printing device 10 is a device that processes a print job output from the information terminal device 20, prints data on a print medium such as paper or the like, and outputs the print medium. The printing device 10 includes a communication unit 11, a storage unit 12, a display unit 13, an operation unit 14, an input unit 15, a printer unit 16, and a control unit 17, as illustrated in FIG. 1.

The communication unit 11 includes, for example, a communication module, and communicates with the information terminal device 20 via the network NW. The communication unit 11, for example, receives a print job output from the information terminal device 20.

The storage unit 12 includes, for example, a RAM (Random Access Memory), a ROM (Read Only Memory), a nonvolatile memory, and the like. The storage unit 12 functions, for example, as a working area of a CPU (Central Processing Unit) included in the control unit 17, a program area for storing various types of programs such as an operation program intended to control the entire printing device 10, and a data area for storing various types of data such as a keyword management table T1, and the like.

Additionally, the storage unit 12 functions as a command storage unit 12*a* and a job-waiting-to-be-processed storage unit 12*b* as illustrated in FIG. 1.

The command storage unit 12*a* stores a user-defined code (to be described in detail later) input via the input unit 15. As a result, for example, a maintenance person of a maker can learn a function added and mounted by a user. A function added by many users is checked, so that development efficiency can be increased.

The job-waiting-to-be-processed storage unit 12*b* temporarily stores a print job for which a RIP (Raster image Processor) process is executed by a RIP processing unit 17*h* (to be described in detail later).

Figure 2:
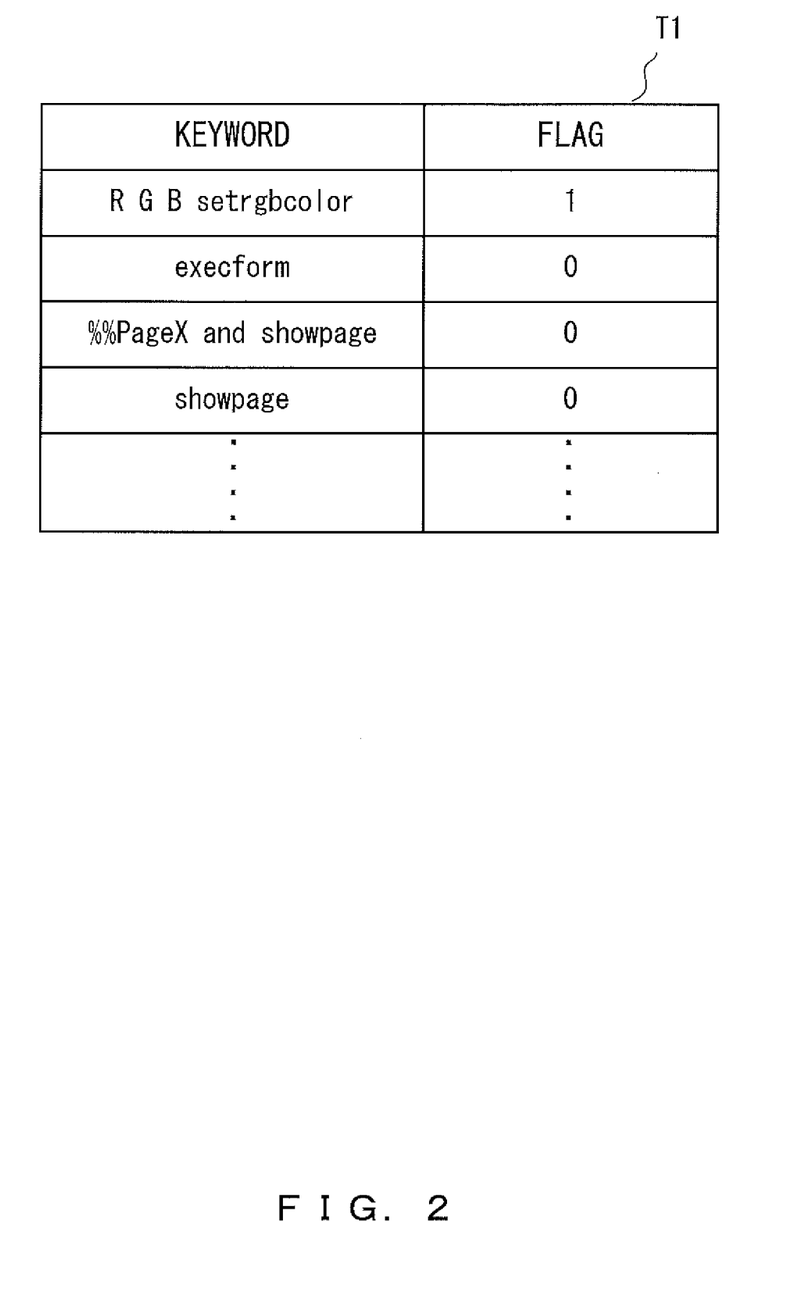
FIG. 2 illustrates a configuration example of a keyword management table in the embodiment.

Here, the keyword management table T1 stored in the data area of the storage unit 12 is described with reference to FIG. 2. FIG. 2 illustrates a configuration example of the keyword management table T1 in this embodiment.

The keyword management table T1 is a table referenced when a detection unit 17*d* (to be described in detail later) detects a keyword. The keyword management table T1 is a table in which a flag is made to correspond to each keyword as illustrated in FIG. 2.

The flag is a flag for designating a keyword to be detected when the detection unit 17*d* detects the keyword, and is managed by a setting unit 17*c* (to be described in detail later). In this embodiment, a value "1" of the flag indicates a keyword to be detected, whereas a value "0" of the flag indicates a keyword not to be detected. An initial value of the flag is "0".

By making a flag correspond to each keyword in this way, the detection unit 17*d* can identify a keyword to be detected when it detects the keyword.

Figure 3:
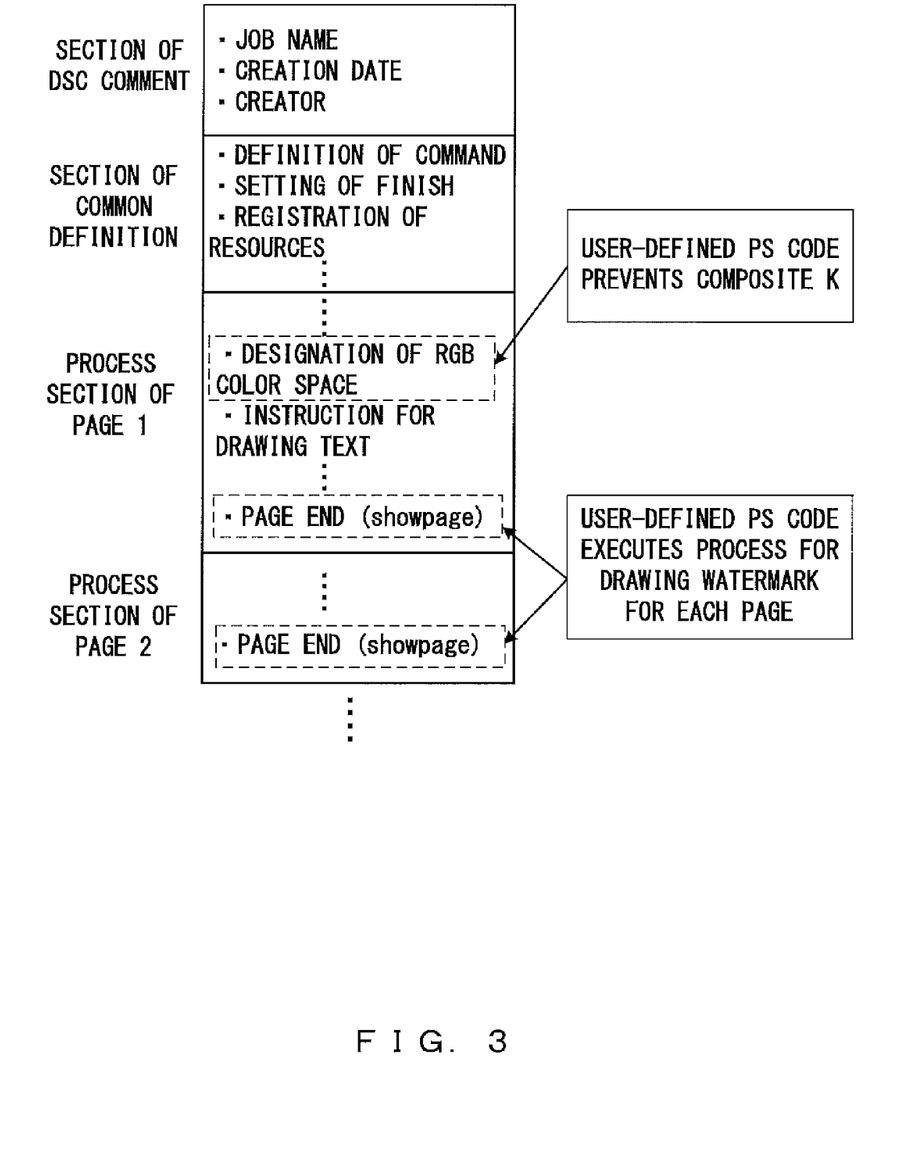
FIG. 3 illustrates an example of a PS code received as a print job, and that of a keyword in the example of the PS code.

The keyword is a keyword for identifying an insertion destination of a user-defined code. When the user-defined code is, for example, a command for preventing a composite K, the detection unit 17*d* detects a command named "RGB setrgbcolor", as illustrated in FIGS. 2 and 3, by analyzing a received print job. Here, FIG. 3 illustrates an example of a PS code received as a print job, and that of the keyword in the example of the PS code.

Additionally, when the user-defined code is, for example, a command for drawing a watermark on each page, the detection unit 17*d* analyzes the received print job to detect a page-feed command that is named "showpage", as illustrated in FIGS. 2 and 3, and indicates the end of a page.

Furthermore, when the user-defined code is, for example, a command for performing a measurement of the length of processing time for each page, the detection unit 17*d* analyzes the received print job to detect commands named "%% PageX" and "showpage" as illustrated in FIG. 2. Note that "X" of "%% PageX" is a page number.

The user-defined code is a program that is arbitrarily set by a user and input via the input unit 15. The user-defined code is a program for executing an instruction for changing or adding a setting including a printing setting. The user-defined code is a PS code in this embodiment. Namely, the user-defined code is a command that implements a process desired by a user and is written in the same page description language as that of a print job. This embodiment assumes that a keyword setting instruction indicating a keyword selected by a user is input via the input unit 15 along with the user-defined code.

Referring back to FIG. 1. The display unit 13 includes, for example, a display device such as an LCD (Liquid Crystal Display), an organic EL (Electro-Luminescence), or the like. The display unit 13 displays, on a display screen, for example, an image, various types of messages, buttons of various types of functions, and the like.

The operation unit 14 is implemented, for example, with a ten key, a touch panel, or the like, which is displayed on the display screen of the display unit 13, and the like. A user can cause the printing device 10 to execute his or her desired process with an input of an instruction to the printing device 10 by operating the operation unit 14.

The input unit 15 includes, for example, an interface such as a USB (Universal Serial Bus) or the like, a communication module, or the like. The input unit 15 accepts a user-defined code and a keyword setting instruction. Then, the input unit 15 outputs the accepted user-defined code to the storage processing unit 17*b*, and outputs the accepted keyword setting instruction to the setting unit 17*c*. Note that the communication unit 11 may function also as the input unit 15.

The printer unit 16 includes, for example, a printer engine or the like. When raster data is generated by the RIP processing unit 17*h*, the printer unit 16 executes a layout process for each page. Then, the printer unit 16 executes an image process such as calibration or the like for the page data for which the layout process has been executed, prints the data on a print medium, and outputs the medium.

The control unit 17 includes, for example, a CPU and the like. The control unit 17 implements functions as the determination unit 17*a*, the storage processing unit 17*b*, the setting unit 17*c*, the detection unit 17*d*, the merging unit 17*e*, the analysis unit 17*f*, the notification generation unit 17*g*, and the RIP processing unit 17*h*, as illustrated in FIG. 1 by executing an operation program stored in the program area of the storage unit 12. Moreover, the control unit 17 executes processes such as a control process for controlling the entire printing device 10, a merging process to be described in detail later, and the like, by executing the operation program.

The determination unit 17*a* executes determination processes of various types. For example, the determination unit 17*a* determines whether a print job has been received.

Moreover, the determination unit 17a determines whether a user-defined code has been input.

Additionally, the determination unit 17a determines whether a keyword identified by the setting unit 17c is registered in the keyword management table T1. Moreover, the determination unit 17a determines whether a keyword to be detected has been detected by the detection unit 17d. Furthermore, the determination unit 17a determines whether a problem will be caused on the basis of a result of a verification made by the analysis unit 17f.

When a user-defined code has been input, the storage processing unit 17b stores the input user-defined code respectively in the data area of the storage unit 12 and the command storage unit 12a. Moreover, the storage processing unit 17b stores, in the job-waiting-to-be-processed storage unit 12b, the received print job or a print job after being merged with the user-defined code by the merging unit 17e.

The setting unit 17c sets a keyword to be detected. More specifically, the setting unit 17c identifies the keyword on the basis of the input keyword setting instruction. When the identified keyword is registered in the keyword management table T1, the setting unit 17c sets a flag corresponding to the identified keyword to "1". In the meantime, when the identified keyword is not registered in the keyword management table T1, the setting unit 17c stores the identified keyword in an added entry after it adds the entry, and sets a flag of the added entry to "1".

The detection unit 17d detects the keyword to be detected by analyzing the received print job. More specifically, the detection unit 17d searches a flag field of the keyword management table T1 to identify a keyword having the flag value of "1". Then, the detection unit 17d detects the identified keyword by analyzing the received print job.

When the keyword is detected by the detection unit 17d, the merging unit 17e merges the received print job and the input user-defined code.

At this time, the merging unit 17e inserts the user-defined code after the detected keyword in normal cases. However, when a process of the user-defined code is, for example, a process such as a measurement of the length of processing time of a particular page, the merging unit 17e makes the processes such as the measurement of the length of processing time and the like feasible by inserting the user-defined code before the detected keyword. Moreover, when the process of the user-defined code is, for example, a process for invalidating a command intended to execute a registered form, the merging unit 17e replaces the detected keyword with the user-defined code. The instruction of the insertion position or the replacement of the user-defined code may be incorporated, for example, in the keyword setting instruction.

When the user-defined code is, for example, a command for preventing a composite K, the merging unit 17e determines whether R=G=B on the basis of the command "RGB setrgbcolor" detected by the detection unit 17d. When R=G=B, the merging unit 17e inserts the command for executing a process of preventing a composite K (namely, a process of converting to a grayscale).

Alternatively, when the user-defined code is, for example, a command for drawing a watermark for each page, the merging unit 17e inserts the command (user-defined code) of the process of drawing a watermark, for example, immediately before the command "showpage" detected by the detection unit 17d.

Further alternatively, when the user-defined code is, for example, a command for performing a measurement of the length of processing time for each page, the merging unit 17e inserts the command (user-defined code) for performing a measurement of the length of time immediately after the command "%% PageX" detected by the detection unit 17d, and immediately before the command "showpage".

Still further alternatively, when the user-defined code is, for example, a command for inserting a blank page before the back of a front cover, the merging unit 17e inserts the command (user-defined code) for inserting a blank page immediately after the command "showpage" detected by the detection unit 17d for the front cover page.

Still further alternatively, when the user-defined code is, for example, a command for invalidating the command for executing a registered form, the merging unit 17e replaces the command "execform" detected by the detection unit 17d with "execform{pop}def". Here, "execform" is a command for drawing a fixed object used in variable printing.

The analysis unit 17f analyzes a print job after being merged by the merging unit 17e, and verifies whether a logical error will be caused by the merging with the user-defined code Namely, the analysis unit 17f verifies whether an error will be caused when the printing process of the print job after being merged is executed.

When the analysis unit 17f determines as a result of the verification that the error will be caused, the notification generation unit 17g generates, for example, an error notification indicating content of the error. Then, the notification generation unit 17g transmits, via the communication unit 11, the generated error notification to the information terminal device 20 that has output the print job to be processed. In this way, the information terminal device 20 that has received the error notification can notify a user that the error will be caused, for example, by displaying the content of the error on the display screen.

The RIP processing unit 17h obtains a print job, for example, in an order of print jobs that are stored earlier, from the job-waiting-to-be-processed storage unit 12b, and generates raster data by executing the RIP process for the obtained print job.

Figure 4:
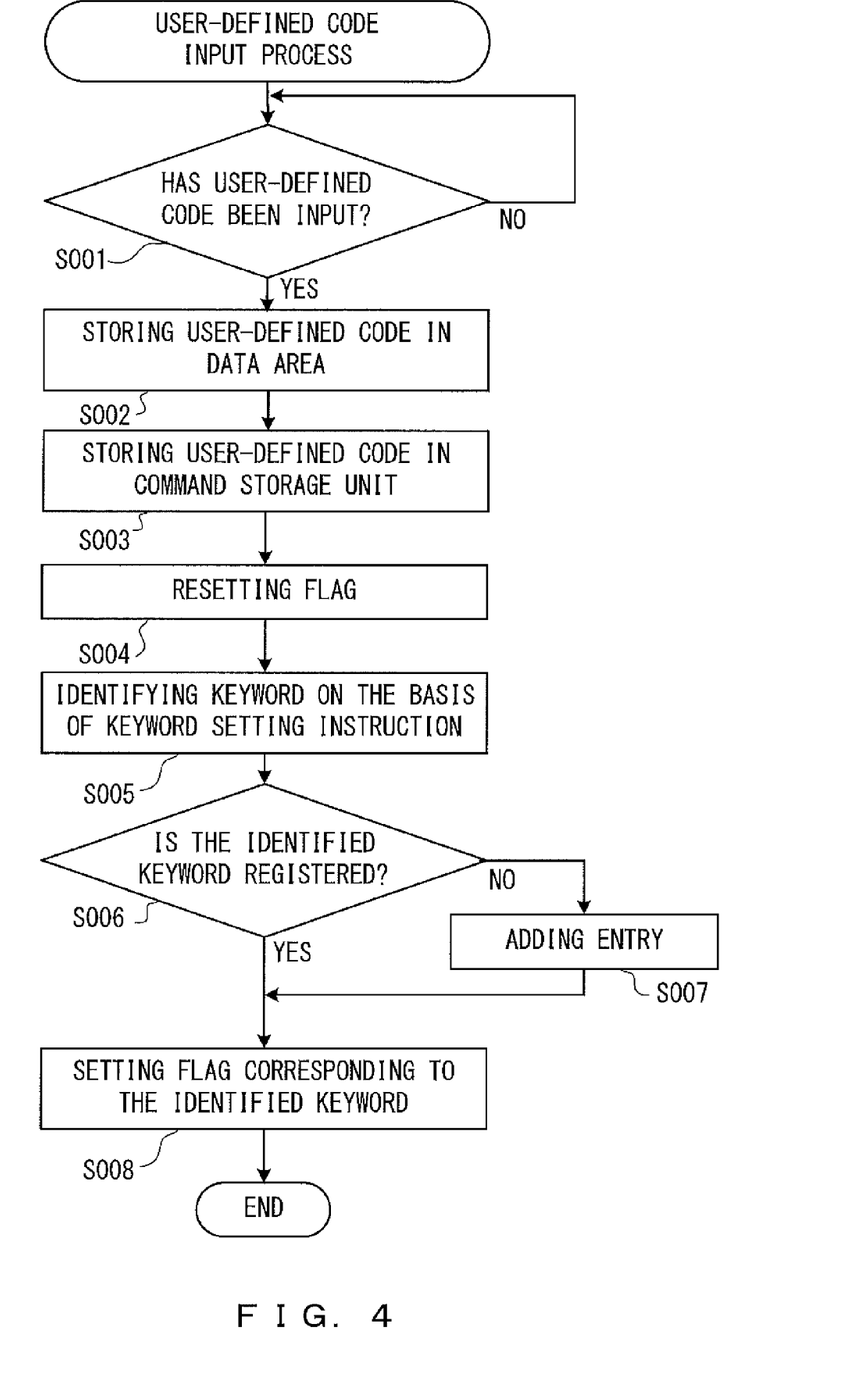
FIG. 4 is an example of a flowchart for explaining a user-defined code input process in the embodiment.

A user-defined code input process in this embodiment is described next with reference to FIG. 4. FIG. 4 is an example of a flowchart for explaining the user-defined code input process in this embodiment. The user-defined code input process is started by using an input of a user-defined code as a trigger.

The determination unit 17a determines whether a user-defined code has been input (step S001). When the determination unit 17a determines that the user-defined code has not been input ("NO" in step S001), the process of step S001 is repeated so as to wait for an input of the user-defined code.

Alternatively, when the determination unit 17a determines that the user-defined code has been input ("YES" in step S001), the storage processing unit 17b stores the input user-defined code in the data area of the storage unit 12 (step S002), and stores, for example, a copy of the code in the command storage unit 12a (step S003).

Then, the setting unit 17c resets the flag of the keyword management table T1 (step S004), and identifies a keyword on the basis of an input keyword setting instruction (step S005).

Then, the determination unit 17a references the keyword management table T1, and determines whether the identified keyword is registered (step S006).

When the determination unit 17a determines that the identified keyword is not registered ("NO" in step S006), the setting unit 17c adds an entry to the keyword management table T1, and registers the identified keyword (step S007).

Then, the setting unit 17c sets, to "1", a flag corresponding to the identified keyword (step S008). Then, this process is ended.

Alternatively, when the determination unit 17a determines that the identified keyword is registered ("YES" in step S006), the process of step S007 is skipped, and the setting unit 17c sets, to "1", the flag corresponding to the identified keyword (step S008). Then, this process is ended.

Figure 5:
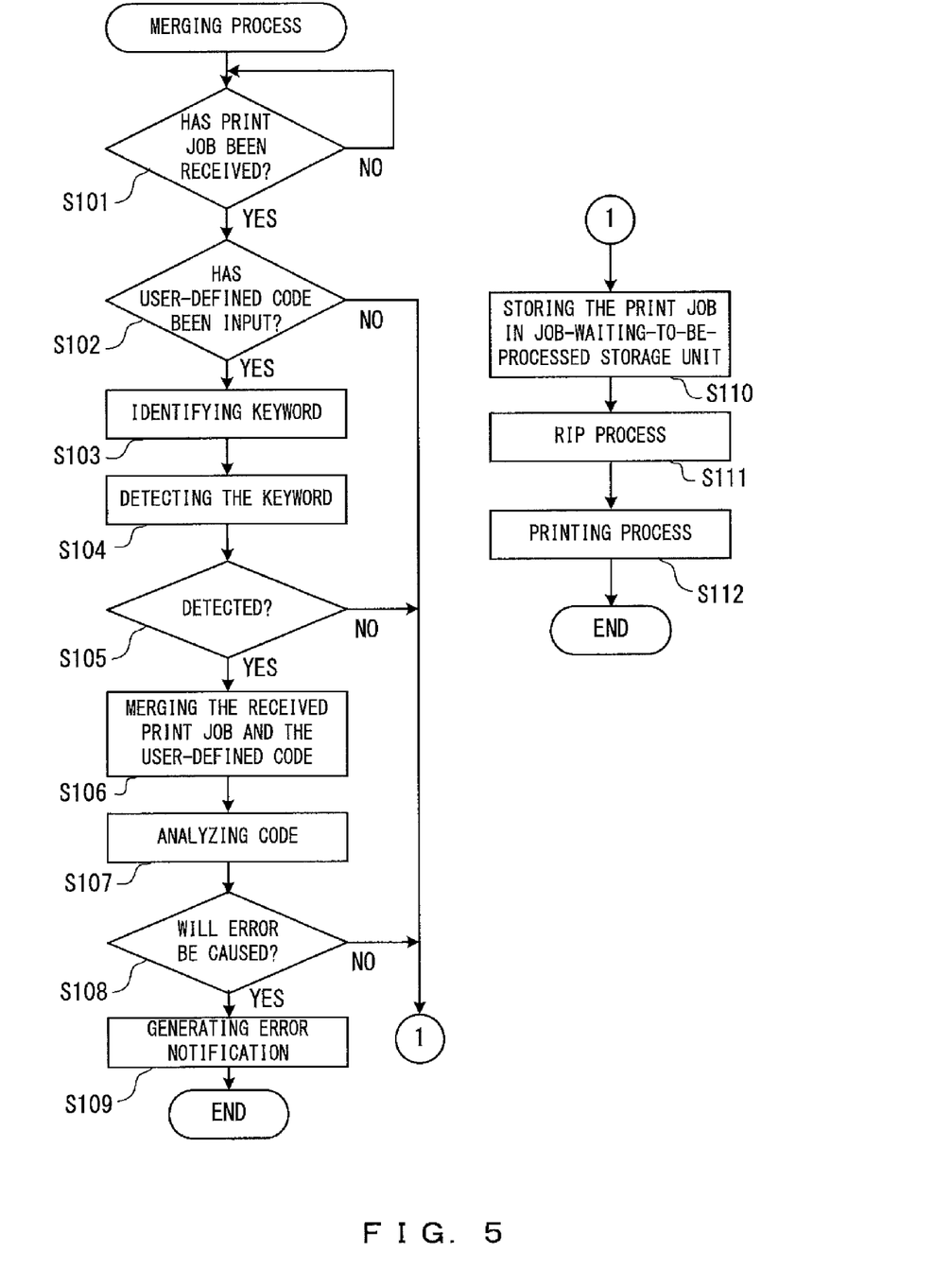
FIG. 5 is an example of a flowchart for explaining a merging process in the embodiment.

A merging process in this embodiment is described next with reference to FIG. 5. FIG. 5 is an example of a flowchart for explaining the merging process in this embodiment. This merging process is started by using a reception of a print job as a trigger.

The determination unit 17a determines whether a print job has been received (step S101). When the determination unit 17a determines that the print job has not been received ("NO" in step S101), the process of step S101 is repeated so as to wait for the reception of the print job.

Alternatively, when the determination unit 17a determines that the print job has been received ("YES" in step S101), the determination unit 17a further determines whether a user-defined code has been input (step S102). When the determination unit 17a determines that the user-defined code has not been input ("NO" in step S102), the storage processing unit 17b stores the received print job in the job-waiting-to-be-processed storage unit 12b (step S110). Then, the flow proceeds to the process of step S111 to be described later.

In the meantime, when the determination unit 17a determines that the user-defined code has been input ("YES" in step S102), the detection unit 17d searches the flag field of the keyword management table T1 to identify a keyword having a flag value of "1" (step S103). Then, the detection unit 17d detects the identified keyword by analyzing the received print job (step S104).

Then, the determination unit 17a determines whether the keyword has been detected by the detection unit 17d (step S105). When the determination unit 17a determines that the keyword has not been detected ("NO" in step S105), the storage processing unit 17b stores the received print job in the job-waiting-to-be-processed storage unit 12b (step S110). Then, the flow proceeds to the process of step S111 to be described later.

Alternatively, when the determination unit 17a determines that the keyword has been detected ("YES" in step S105), the merging unit 17e merges the received print job and the input user-defined code (step S106). At this time, the merging unit 17e inserts the user-defined code after the detected keyword in normal cases. However, when the process of the user-defined code is, for example, a process such as a measurement of the length of processing time of a particular page, the merging unit 17e makes the process such as the measurement of the length of processing time feasible by inserting the user-defined code before the detected keyword. Moreover, when the process of the user-defined code is, for example, a process for invalidating the command for executing a registered form, the merging unit 17e replaces the detected keyword with the user-defined code.

Then, the analysis unit 17f analyzes the print job after being merged by the merging unit 17e, and verifies whether an error will be caused when the printing process will be executed (step S107). Then, the determination unit 17a determines whether the error will be caused on the basis of a result of the verification made by the analysis unit 17f (step S108).

When the determination unit 17a determines that the error will be caused ("YES" in step S108), the notification generation unit 17g generates an error notification, and transmits, via the communication unit 11, the generated error notification to the information terminal device 20 that has output the print job to be processed (step S109). Then, this process is ended.

Alternatively, when the determination unit 17a determines that the error will not be caused ("NO" in step S108), the storage processing unit 17b stores the print job after being merged in the job-waiting-to-be-processed storage unit 12b (step S110).

Then, the RIP processing unit 17h obtains a print job in an order of print jobs that are stored earlier from the job-waiting-to-be-processed storage unit 12b, and generates raster data by executing the RIP process for the obtained print job (step S111). Then, the printer unit 16 executes a printing process for the generated raster data (step S112). Then, this process is ended.

According to the above described embodiment, the printing device 10 merges a print job to be processed and an input user-defined code. As a result, a function desired by a user is enabled to be added on the side of the user, and is applied to a print job to be processed even if the function is not supported by the printing device 10. By enabling the print job to be processed and the user-defined code to be merged, processes other than printing settings, such as a measurement of the length of processing time for each page, and the like, are also made feasible. This makes it easy for a user to add his or her desired function, whereby a development period can be reduced. Moreover, since development resources can be concentrated on principal functions, development efficiency can be increased.

Additionally, according to the above described embodiment, the printing device 10 searches for a code that configures a print job to be processed, and merges the print job to be processed and an input user-defined code when the code includes a specified keyword. As a result, when there is no portion to processed that is executed by adding a user-defined code in a print job to be processed, it becomes possible to not merge the print job to be processed and the user-defined code. As a result, a logical error at the time of merging can be prevented from being caused.

Furthermore, according to the above described embodiment, the printing device 10 verifies whether an error will be caused when a printing process is executed by analyzing the print job after being merged. When as a result of the verification the printing device 10 determines that the error will be caused, the printing device 10 does not execute the printing process. As a result, an error can be prevented from being caused when the printing process is executed.

Still further, according to the above described embodiment, the printing device 10 notifies a user of an error when it determines as a result of the verification that the error will be caused. In consequence, the user can learn of an occurrence of an error without visiting an installation site of the printing device 10, whereby the convenience of the user can be improved.

Still further, according to the above described embodiment, the printing device 10 stores and holds an input user-defined code in the command storage unit 12b. As a result, for example, a maintenance person of a maker checks a user-defined code added by a user, whereby the maintenance person can learn a function desired by the user. Inconsequence, development efficiency can be increased.

In the above described embodiment, the user-defined code input process and the merging process are executed on the side of the printing device 10. However, the embodiment is not limited to this one. For example, principal portions of the user-defined code input process and the merging process may be executed on the side of the information terminal device 20, and a print job after being merged with a user-defined code may be output to the printing device 10.

Additionally, the above described embodiment has been described by taking a PS code as an example. However, the page description language is not limited to the PS code. The configuration referred to in the above described embodiment can be applied as long as the page description language is a programming language in itself.

Furthermore, the keyword setting instruction is input along with the user-defined code in the above described embodiment. However, the input of the keyword setting instruction is not limited to this way. A keyword to be detected may be automatically set on the basis of an input user-defined code.

Still further, in the above described embodiment, a server managed by a maker may transmit a user-defined code held in the command storage unit 12a at a specified timing (for example, periodically). In this case, the printing device 10 may delete the user-defined code after it is transmitted. As a result, a maintenance person of a maker can collect information of a function added by a user without visiting an installation site of the printing device 10.

An operation program for performing the above described operations may be stored on a computer-readable recording medium such as a flexible disk, a CD-ROM (Compact Disk-Read Only Memory), a DVD (Digital Versatile Disk), an MO (Magneto Optical disk) or the like, distributed, and installed in a computer of the printing device 10 (or the information terminal device 20), so that the above described processes can be executed. Moreover, the program may be stored in a disk device or the like included in a server device present on the Internet, and the program is, for example, superposed on a carrier wave and downloaded into a computer.

The embodiment according to the present invention has been described in detail. However, the present invention is not limited to the aforementioned embodiment. The present invention can adopt various configurations or embodiments within a scope that does not depart from the gist of the present invention.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An image processing device supporting a print job written in a page description language, which is a programming language, the image processing device comprising:
    an input unit which inputs a user-defined code that is a command implementing a process desired by a user and that is written in the same page description language as the print job to be processed;
    a storage unit which stores a keyword management table that manages keywords;
    a detection unit which identifies a keyword corresponding to the input user-defined code from within the keyword management table, and which detects the identified keyword within the print job; and
    a processor which executes a process of merging the print job to be processed and the user-defined code by inserting the user-defined code before or after a position within the print job at which the keyword has been detected.

2. The image processing device according to claim 1, wherein the storage unit stores the input user-defined code.

3. A non-transitory computer-readable recording medium having stored thereon a program for a computer of an image processing device supporting a print job written in a page description language, which is a programming language, the program causing the computer to perform functions comprising:
    accepting input of a user-defined code, which is a command that implements a process desired by a user and which is written in the same page description language as the print job to be processed;
    identifying a keyword corresponding to the input user-defined code from within a keyword management table that manages keywords;
    detecting the identified keyword within the print job; and
    merging the print job to be processed and the user-defined code by inserting the user-defined code before or after a position within the print job at which the keyword has been detected.

* * * * *